June 4, 1963 SVEN-ERIK RONNERSTRÖM 3,092,210
BRAKE FOR AIRPLANE-ARRESTING DEVICES
Filed April 13, 1960
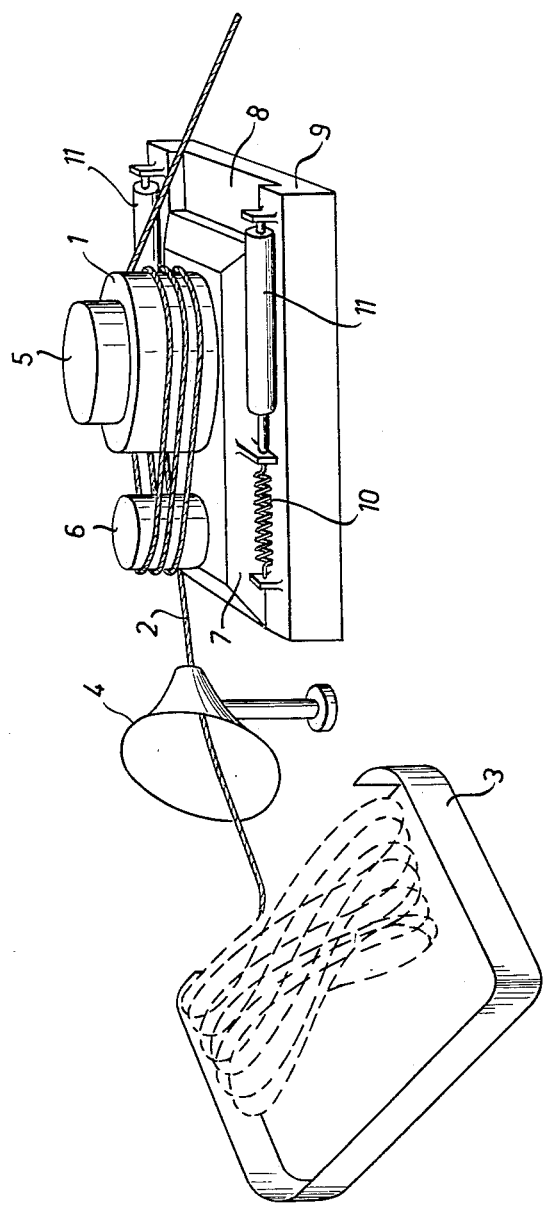
Inventor
Sven-Erik Ronnerström
by Sommers & Young
Attorneys

United States Patent Office 3,092,210
Patented June 4, 1963

3,092,210
BRAKE FOR AIRPLANE-ARRESTING DEVICES
Sven-Erik Ronnerström, Borjsgatan 46,
Norrkoping 5, Sweden
Filed Apr. 13, 1960, Ser. No. 21,968
Claims priority, application Sweden May 29, 1959
2 Claims. (Cl. 188—1)

The present invention relates to a braking device for use in connection with airplane arresting or runaway-preventing devices, in which an airplane catching member, such as a net traversing the path of landing of airplanes, is connected at one end or both ends to a braking wire adapted, when a braking is taking place, to be unwound from a brake drum of a braking apparatus or assembly. In this connection, one of the major problems is to provide a construction allowing the movable elements taking part in the braking operation to be accelerated to the high run-in speed of the airplane without giving rise to stresses of a magnitude sufficiently high to cause rupture of the elements of the assembly, or to necessitate such heavy structural dimensions as would cause damage to the airplane. The accelerating forces will increase with increasing dimensions, and the relative mechanical strength will not be notably improved.

On account of the large amounts of energy to be absorbed in a brief period of time the arresting distance will be very long. It is thus advantageous to use a steel wire which is allowed to run out against a certain braking action. Since the wire is relatively long, of the order say, two or three hundred yards, the wire itself represents a considerable mass which will have to be accelerated up to the speed of the airplane at the beginning of the braking operation. Therefore, the various methods of solving the problems here concerned aim at designing a brake having a very small mass. Several constructions exist which, however, are rather complicated and thus, costly and not very reliable in operation.

The present invention has for its object to provide a braking device which solves the problem above outlined while allowing simple and reliable construction. The invention is characterized, chiefly, by the fact that a portion only of the braking wire is held around the brake drum while the remainder thereof is stored in front of the brake drum, as seen in the run-out direction, and is so coiled that, as the wire is running out to the brake drum for braking purpose, this will take place with a successive acceleration of sections of the wire, one at a time. By this means, a portion only of the braking wire will form part of the mass of inertia which has to be accelerated at the beginning of the braking operation. The remainder of the movable braking system may be dimensioned so as to be light of weight. In this way it is possible to provide for a moving mass which is only 40 to 50% of the weight of the moving mass of prior-art constructions.

The invention is illustrated in the accompanying drawing which shows a perspective view of a preferred embodiment thereof.

In the drawing, the reference numeral 1 designates a brake drum around which a braking wire 2 is wound. The wire is coiled in a storage container 3 in such a way that only the portion of the wire next to the outlet of the box will move for a brief period of the arresting procedure. Thus, the storage functions in a manner similar to that of a machine-wound cord ball where the cord may be withdrawn through an opening in the ball without affecting the whole length of the cord.

From the storage box the braking wire extends through a guide means which may be in the shape of a flared tube or horn 4 or a similar guide means having for its purpose to damp vibrations to which the wire may be subjected when pulled out from the storage container very rapidly.

From said horn the wire runs to the braking assembly including a brake drum provided with a brake 5 known per se. The interior construction of the brake 1 and the associated drum 5 may be of any appropriate kind, as, for instance, like that shown in the U.S. Patent No. 1,582,198, to Walbridge. In order to obtain sufficient braking action, the wire should be wound a few turns around the brake drum. This, however, involves the problem that the wire will have a tendency to move helically in the axial direction along the brake drum. It is possible to provide for a functionally reliable slippage of the wire axially on the drum in order to counteract this movement, but this would complicate the construction, and therefore, according to a development of the invention, the arrangement is so devised that the wire will not be helically displaced axially along the brake drum. This has been provided for by causing the wire not to engage the drum along its entire circumference, but to run about the same for a portion of its circumference only and then about an idle auxiliary roller 6 which is located near the drum with its axis parallel to that of the drum. This auxiliary roller has for its object to guide the wire back to a constant position on the drum after each turn. This effect may be evident if one regards the drum 1 as well as the roller 6 as each divided into a number of independent grooved wheels mounted on the respective shafts. These wheels will all rotate at the same peripheral velocity, since the same wire is running in engagement therewith, and thus they could be interconnected in such a way that the wheels of the drum form a unitary structure and those of the roller a second one. From its last turn around the drum, the braking wire runs to the arresting device, known per se, which serves to arrest or catch the airplane.

Owing to the possibility afforded by the invention of obtaining a very lightweight braking device, vibrations occurring in the arresting device can be overcome by making the brake displaceable towards and away from the arresting device. As shown in the drawing, the drum, the brake and the roller are all mounted on a block 7 which is slidably mounted in a guideway 8 formed in a base 9. Inserted between said block and said base are springs 10 and shock-absorbing fluid brakes 11. The said tension of said springs is so adjusted as to cause the block 7 not to be moved until after the tension of the wire 2 exceeds a predetermined value which exceeds the normally applied braking force by a predetermined margin.

According to a further constructional form of the vibration damping device according to the invention, a brake regulator of known construction may be incorporated in the braking mechanism. In operation, when a net to which the braking wire is connected is struck by an airplane to be arrested, the wire end connected to the net will be accelerated to the high run-in speed of the airplane, thereby causing the brake drum and roller to rotate at a correspondingly accelerated speed. Since only a few turns of wire are wound on the brake drum and roller there is only a rather light mass weight taking part at this acceleration. As a result, there will be no risk of the wire being torn off by the jerk to which the wire will be subjected at the beginning of the acceleration period.

In the continued stretching of the net a gradually increasing length of wire will be uncoiled from the storage in box 3, thereby causing a gradually increasing weight to be dragged by the airplane in addition to the resistance exerted by the brake.

As an additional security against tearing off the wire at the very beginning of the acceleration period, the braking means 10 and 11 are provided to allow the block 75 with the brake to slide a little distance, should the jerk at the wire become very strong due to an extremely high run-in speed and mass of the airplane in striking the net.

I claim:

1. A brake assembly for arresting vehicles or the like comprising a wire for carrying the stress applied to one end portion thereof by the arrest of a vehicle, said wire having a major portion thereof stored in a stationary storage container in which it is arranged in like coil portions to be withdrawn coil portion by coil portion seriatum without disturbing remaining coil portions thereof, so as to minimize the inertia and stress in the wire especially at the start of an arrest when high speed acceleration of the wire is required, a guide element forwardly of said storage container through which said wire passes, a brake drum, a roller adjacent to said brake drum between the same and said guide element, both said roller and brake drum being disposed on parallel axes, said wire being wound by a plurality of turns around said brake drum and roller so as to be constrained by the latter to remain at approximately constant axial locations in said drum.

2. A brake assembly according to claim 1 and in which a base is provided having a guide, a slide mounted in said guide, said roller and brake drum being mounted on said slide, and brake means for resisting movement of said slide in said guide in the direction in which the wire is pulled.

References Cited in the file of this patent

UNITED STATES PATENTS

| | | |
|---|---|---|
| 1,085,189 | Barienger | Jan. 27, 1914 |
| 1,582,198 | Walbridge | Apr. 27, 1926 |
| 1,789,653 | Hoyt | Jan. 20, 1931 |
| 1,830,535 | Fitch | Nov. 3, 1931 |
| 2,474,125 | Schultz | June 21, 1949 |
| 2,922,623 | Simmons | Jan. 26, 1960 |
| 2,971,727 | Haber | Feb. 14, 1961 |